(12) United States Patent
Zhu et al.

(10) Patent No.: US 9,788,218 B2
(45) Date of Patent: Oct. 10, 2017

(54) ALARM PROCESSING METHOD AND DEVICE, ALARM ASSOCIATED INFORMATION SETTING METHOD

(71) Applicant: ZTE CORPORATION, Shenzhen, Guangdong Province (CN)

(72) Inventors: Weihong Zhu, Shenzhen (CN); Shenghao Liu, Shenzhen (CN)

(73) Assignee: XI'AN ZHONGXING NEW SOFTWARE CO., LTD., Xi'An, Shaanxi (CN)

( * ) Notice: Subject to any disclaimer, the term of this patent is extended or adjusted under 35 U.S.C. 154(b) by 138 days.

(21) Appl. No.: 14/761,625

(22) PCT Filed: Sep. 3, 2013

(86) PCT No.: PCT/CN2013/082828
§ 371 (c)(1),
(2) Date: Jul. 17, 2015

(87) PCT Pub. No.: WO2014/127621
PCT Pub. Date: Aug. 28, 2014

(65) Prior Publication Data
US 2015/0373564 A1    Dec. 24, 2015

(30) Foreign Application Priority Data
Feb. 21, 2013    (CN) .......................... 2013 1 0054992

(51) Int. Cl.
*H04W 24/04*    (2009.01)
*H04L 12/24*    (2006.01)

(52) U.S. Cl.
CPC ......... *H04W 24/04* (2013.01); *H04L 41/0604* (2013.01); *H04L 41/0613* (2013.01); *H04L 41/0677* (2013.01); *H04L 41/0631* (2013.01)

(58) Field of Classification Search
CPC ............. H04W 24/10; H04W 72/1284; H04W 36/0088; H04W 24/04; H04L 41/0613
(Continued)

(56) References Cited

U.S. PATENT DOCUMENTS

| 6,445,774 B1 | 9/2002 | Kidder et al. |
| 7,016,312 B1 * | 3/2006 | Semaan ............. H04L 41/0681 370/254 |
| 2010/0052924 A1 * | 3/2010 | Bajpay ................ H04L 41/0631 340/635 |

FOREIGN PATENT DOCUMENTS

| CN | 1863080 A | 11/2006 |
| CN | 101022638 A | 8/2007 |

(Continued)

*Primary Examiner* — Jae Y Lee
*Assistant Examiner* — Jean F Voltaire
(74) *Attorney, Agent, or Firm* — Ling Wu; Stephen Yang; Ling & Yang Intellectual Property (57) ABSTRACT

Disclosed are an optimized alarm processing method and device, and an alarm associated information setting method, wherein the alarm processing method includes: a logic function module detecting an event which can trigger an alarm, and sending an alarm generation request to an alarm generation module; the alarm generation module determining alarm type, alarm path and level of the alarm triggered by the event in accordance with the alarm associated information stored in an alarm associated information storage module; if the determined alarm type is a correlated alarm, first inquiring an alarm memory module and judging whether the next level of alarm on the alarm path to which the correlated alarm belongs is reported or not, if not reported, generating and reporting the alarm; if reported, no generating or reporting the alarm.

8 Claims, 4 Drawing Sheets

(58) Field of Classification Search
USPC .......................................................... 370/216
See application file for complete search history.

(56) References Cited

FOREIGN PATENT DOCUMENTS

| CN | 101217315 A | 7/2008 |
| CN | 101938366 A | 1/2011 |
| CN | 102111788 A | 6/2011 |

* cited by examiner

ALARM PROCESSING METHOD AND DEVICE, ALARM ASSOCIATED INFORMATION SETTING METHOD

TECHNICAL FIELD

The present document relates to the field of mobile communication network management, and more particularly, to an optimized alarm processing method and device, and an alarm associated information setting method.

BACKGROUND

The interface between the network management system (NMS) and the network Element Management System (EMS) is called northbound interface (Itf-N). The EMS mainly completes the function of the network element management layer (EML) in the International Telecommunications Union Telecom Management Network (ITU TMN), namely the functions of managing one or more mobile communication devices, and usually the EMSs of different equipment suppliers are not universal. The NMS mainly completes the function of the network management layer (NML) in the ITU TMN and is responsible for managing all the network elements within a managed network. In the case that the managed network (called a subnet) has a plurality of equipment suppliers, the purpose of managing the entire subnet can be achieved through their respective EMS managements.

When a mobile communication device fails, corresponding alarm information will be generated. If the NMS subscribes related alarms, the alarm information will be reported to the NMS by the EMS via the northbound interface when a fault occurs. According to the current alarm processing method, when a device fails, the number of generated alarms is very large, and a large number of alarm notification messages needs to be transported through the northbound interface, causing a heavy burden on the system. Meanwhile, most of the alarm information currently reported to the NMS cannot provide clear fault cause information and fault repair operation instructions, and cannot provide fast and accurate help for the management staffs to locate the fault and solve the problem, therefore, a method is needed to improve the alarm efficiency and provide accurate fault location at the same time reducing the number of alarms.

SUMMARY

In order to solve the abovementioned technical defect, the embodiment of the present document provides an optimized alarm processing method and device, and an alarm associated information setting method, its object is to improve the alarm efficiency, and provide fast and accurate fault location at the same time of reducing the number of alarms, so as to quickly solve a fault occurred in the system.

To achieve the abovementioned object, the embodiment of the present document takes the following technical scheme:

an alarm processing method, adapted to a communication system comprising a logic function module, an alarm generation module, an alarm associated information storage module and an alarm memory module, the method comprises:

the logic function module sending an alarm generation request to the alarm generation module when detecting an event which can trigger an alarm;

the alarm generation module determining alarm type, alarm path and level of the alarm which is triggered by the event according to the alarm associated information stored in the alarm associated information storage module;

if the determined alarm type is a correlated alarm, first inquiring the alarm memory module and judging whether the next level of alarm on the alarm path to which the correlated alarm belongs is reported or not, if not reported, generating and reporting the alarm; if reported, no generating or reporting the alarm;

a correlated alarm refers to an alarm triggered by an event caused probably by an influence of other logic function units on a local logic function unit.

Alternatively, the method further comprises:

if the determined alarm type is an isolated alarm, the alarm generation module directly generating and reporting the alarm; an isolated alarm refers to an alarm triggered by an event entirely caused by reason of the local logic function unit.

Alternatively, a sequence consisting of alarms hierarchically numbered and caused by a same alarm reason is called an alarm path.

Alternatively, the communication system is a network element in a communication system.

An alarm processing device, adapted to network elements in a network element management system (EMS), wherein, the device comprises:

an alarm associated information storage module, configured to store preset events that may occur during the operation of logic function modules in the network elements as well as associated information of alarms triggered by the occurred events;

a logic function module, configured to send an alarm generation request to an alarm generation module when detecting an event which may trigger an alarm;

an alarm generation module, configured to determine alarm type, alarm path and level of the alarm triggered by the event according to the alarm associated information stored in the alarm associated information storage module; if the determined alarm type is a correlated alarm, first inquire an alarm memory module and judge whether the next level of alarm on the alarm path to which the alarm belongs is reported or not, if not reported, generate and report the alarm; if reported, do not generate or report the alarm;

an alarm memory module, configured to store the associated information of all the generated and reported alarms;

a correlated alarm refers to an alarm triggered by an event caused by the influence of other logic function units on the local logic function unit.

Alternatively, if the alarm type determined by the alarm generation module is an isolated alarm, the alarm generation module directly generates and reports the alarm;

an isolated alarm refers to an alarm triggered by an event entirely caused by reason of the local logic function unit.

Alternatively, a sequence consisting of alarms hierarchically numbered and caused by the same alarm reason is called an alarm path.

An alarm associated information setting method, comprising:

a network management system (NMS) sending an alarm setting command to a network element management system (EMS) through a northbound interface;

upon receiving the alarm setting command, the EMS sending the alarm setting command and parameters to each selected network element, and each network element setting the alarm according to the alarm setting command;

Alternatively, the alarm setting command comprises at least one of the following parameters:

a network element identifier (NE-ID), configured to select one or more network elements to be set;

a logic function module identifier, configured to select a logic function module to be set;

an alarm type, configured to indicate the alarm type to be set;

an alarm path to which the correlated alarm belongs as well as a level of the correlated alarm on the alarm path, configured to respectively indicate the alarm path to which the set correlated alarm belongs as well as the level of the correlated alarm on the alarm path.

Alternatively, the method further comprises:

after completing the setting, storing the setting contents in an alarm type information list, and the alarm type information list is stored in one or more of the logic function module, the network elements, the network element management system, and the network management system according to different hierarchies of the alarm hierarchical processing.

Due to the adoption of the abovementioned technical scheme, the embodiment of the present document comprises the following advantages: reducing the number of reported alarms, ensuring that the reported alarms are alarms at the bottom of all the alarms which may be triggered by an event, and facilitating fast positioning the cause of a fault.

BRIEF DESCRIPTION OF DRAWINGS

The accompanying drawings described herein are used to provide a further understanding of the embodiments of the present document, and constitute a part of the present application, exemplary embodiments of the present document and their descriptions serve to explain the embodiment of the present document, and do not constitute an limitation to the embodiments of the present document; in the accompanying drawings.

PREFERRED EMBODIMENTS OF THE DOCUMENT

In order to make the technical scheme of the embodiments of the present document more clearly understood, in the following, the present document will be elaborated in further detail in the following in conjunction with the accompanying drawings and specific embodiments. It should be noted that in the case of no conflict, embodiments and various modes in the embodiments of the present application may be combined with each other.

Figure 1A:
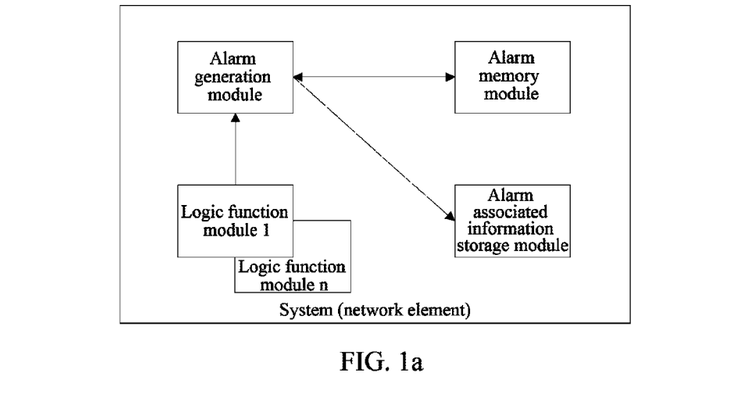
FIG. 1a is a block diagram of an alarm processing device using a centralized alarm generation module and a centralized alarm associated information storage module in accordance with an embodiment of the present document.

FIG. 1a is a block diagram of an alarm processing device using a centralized alarm generation module and a centralized alarm associated information storage module in accordance with an embodiment, and the device comprises:

a logic function module, configured to complete specified logic functions of the system, upon detecting an event which may trigger an alarm, send an alarm generation request to an alarm generation module, and the alarm generation request carries identifier information of the logic function module and identifier information of the detected event; one system (NE) can have a plurality of logic function modules.

An alarm generation module, configured to obtain associated information of the alarm triggered by the detected event from the alarm associated information storage module according to the alarm generation request sent by the logic function module, and judge whether to generate and report the alarm to the EMS or not according to the associated information, and when determining that the alarm type of the alarm triggered by the detected event is an isolated alarm, directly generate and report the isolated alarm to the EMS; and when determining that the alarm type of the alarm triggered by the detected event is a correlated alarm, inquire the alarm memory module whether there exists the next level of alarm reported and on the alarm path to which the alarm belongs or not, and if there exists, do not generate the correlated alarm, and if there does not exist, generate and report the correlated alarm to the EMS. This is a centralized alarm generation module, and there is only one in the entire system (network element).

An alarm associated information storage module: configured to store preset events which may occur during the operation of each logic function module in the system (network element) as well as associated information of alarms triggered by the events, the associated information comprises alarm type, and the alarm type comprises isolated alarm and correlated alarm, wherein, the isolated alarm is an alarm triggered by an event caused only by the local logic function module, and the event may not be caused by the influence of other logic function modules on the local logic function module; a correlated alarm may be an alarm triggered by an event caused by the local logic function module or possibly by the influence of one or more of other logic function modules on the local logic function module. The associated information further comprises the alarm path to which the correlated alarm belongs and the level of the alarm on the alarm path; wherein the alarm path is an alarm sequence consisting of alarms triggered by the same bottom-level event as a certain correlated alarm according to the transport hierarchical order of the distance to the bottom-level event. This is a centralized alarm associated information storage module, and there is only one in the entire system (NE).

An alarm memory module: configured to store the associated information of the generated and reported alarms. Wherein the stored alarms can be cleared after being processed.

Figure 1B:
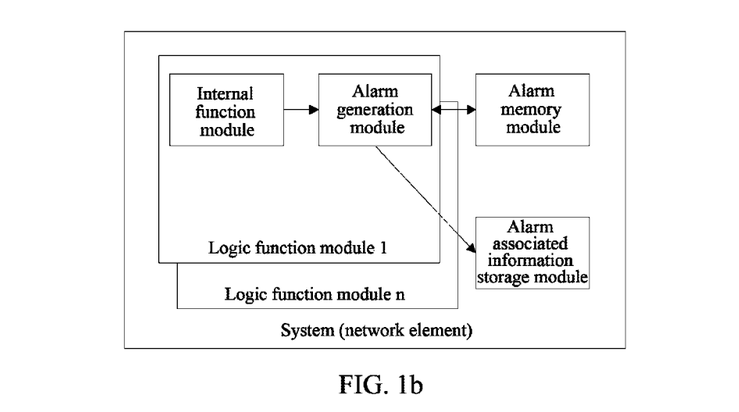
FIG. 1b is a block diagram of an alarm processing device using a distributed alarm generation module and a centralized alarm associated information storage module in accordance with an embodiment of the present document.

FIG. 1b is a block diagram of an alarm processing device using distributed alarm generation modules and a centralized alarm associated information storage module in accordance with another embodiment, and the device comprises:

a logic function module, configured to complete specified logic functions of the system, upon detecting an event which may trigger an alarm, send an alarm generation request to an alarm generation module, and the alarm generation request carries identifier information of the logic function module and identifier information of the detected event; one system (network element) can have a plurality of logic function modules.

An alarm generation module, provided within the logic function module, configured to: obtain the associated information of the alarm triggered by the detected event from the alarm associated information storage module according to the alarm generation request sent by the logic function module, and judge whether to generate and report the alarm to the EMS or not according to the associated information, and when determining that the alarm type of the alarm triggered by the detected event is an isolated alarm, directly generate and report the isolated alarm to the EMS; and when determining that the alarm type of the alarm triggered by the detected event is a correlated alarm, inquire the alarm memory module whether there exists the next level of alarm reported and on the alarm path to which the alarm belongs or not, and if there exists, do not generate the correlated alarm, and if there does not exist, generate and report the correlated alarm to the EMS. This is a distributed alert generation module, there is one in each logic function module, and there may be multiple in the entire system (network element).

An alarm associated information storage module: configured to store the preset events which may occur during the operation of each logic function module in the system (network element) as well as associated information of alarms triggered by the events, the associated information comprises alarm type, and the alarm type comprises isolated alarm and correlated alarm, wherein, the isolated alarm is an alarm triggered by an event caused only by the local logic function module, and the event may not be caused by the influence of other logic function modules on the local logic function module; a correlated alarm may be an alarm triggered by an event caused by the local logic function module or possibly by the influence of one or more of other logic function modules on the local logic function module. The associated information further comprises the alarm path to which the correlated alarm belongs and the level of the alarm on the alarm path; wherein the alarm path is an alarm sequence consisting of alarms triggered by the same bottom-level event as a certain correlated alarm according to the transport hierarchical order of the distance to the bottom-level event. This is a centralized alarm associated information storage module, and there is only one in the entire system (NE).

An alarm memory module: configured to store the associated information of the generated and reported alarms. Wherein the stored alarms can be cleared after being processed.

Figure 1C:
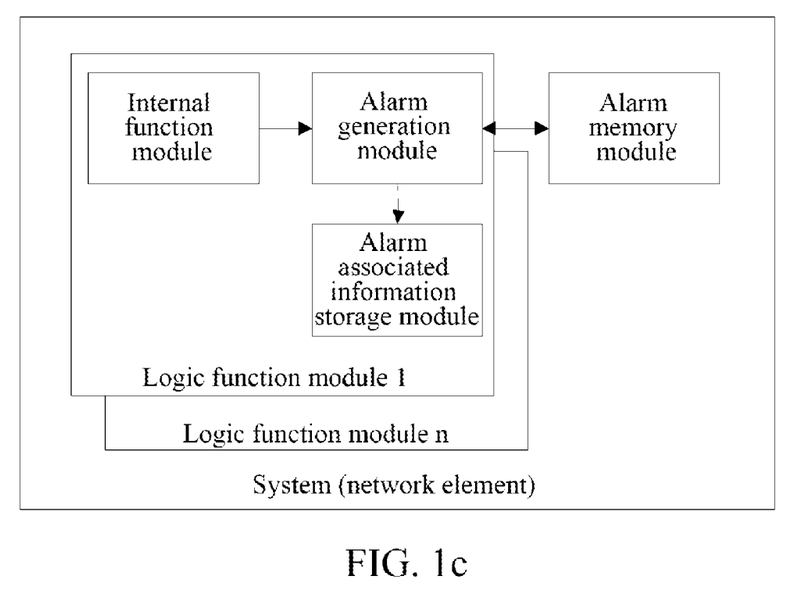
FIG. 1c is a block diagram of an alarm processing device using a distributed alarm generation module and a distributed alarm associated information storage module in accordance with an embodiment of the present document.

FIG. 1c is a block diagram of an alarm processing device using a distributed alarm generation module and a distributed alarm associated information storage module in accordance with another embodiment, and the device comprises:

a logic function module, configured to complete specified logic functions of the system, upon detecting an event which may trigger an alarm, send an alarm generation request to an alarm generation module, and the alarm generation request carries identifier information of the logic function module and identifier information of the detected event; a system (network element) can have a plurality of logic function modules.

An alarm generation module, provided within the logic function module and configured to obtain the associated information of the alarm triggered by the detected event from the alarm associated information storage module according to the alarm generation request sent by the logic function module, and judge whether to generate and report the alarm to the EMS or not according to the associated information, and when determining that the alarm type of the alarm triggered by the detected event is an isolated alarm, directly generate and report the isolated alarm to the EMS; and when determining that the alarm type of the alarm triggered by the detected event is a correlated alarm, inquire the alarm memory module whether there exists the next level of alarm reported and on the alarm path to which the alarm belongs or not, and if there exists, do not generate the correlated alarm, and if there does not exist, generate and report the correlated alarm to the EMS. This is a distributed alert generation module, there is one in each logic function module, and there may be multiple in the entire system (network element).

An alarm associated information storage module: configured to store the preset events which may occur during the operation of each logic function module in the system (network element) as well as associated information of alarms triggered by the events, the associated information comprises alarm type, and the alarm type comprises isolated alarm and correlated alarm, wherein, the isolated alarm is an alarm triggered by an event caused only by the local logic function module, wherein the event may not be caused by the influence of other logic function modules on the local logic function module; a correlated alarm may be an alarm triggered by an event caused by the local logic function module or possibly by the influence of one or more of other logic function modules on the local logic function module. The associated information further comprises the alarm path to which the correlated alarm belongs and the level of the alarm on the alarm path; wherein the alarm path is an alarm sequence consisting of alarms triggered by the same bottom-level event as a certain correlated alarm according to the transport hierarchical order of the distance to the bottom-level event. This is a distributed alarm associated information storage module, there is only one in each logic function module, and there may be multiple in the entire system (NE).

An alarm memory module: configured to store the associated information of the generated and reported alarms. Wherein the stored alarms can be cleared after being processed.

The alarm processing method according to the embodiment of the present document is adapted to a communication system including a logic function module, an alarm generation module, an alarm associated information storage module and an alarm memory module, and the method may comprise:

the logic function module detecting an event which can trigger an alarm, and sending an alarm generation request to the alarm generation module;

the alarm generation module determining alarm type, alarm path and level of the alarm triggered by the event according to the alarm associated information stored in the alarm associated information storage module;

if the determined alarm type is a correlated alarm, first inquiring the alarm memory module and judging whether the next level of alarm on the alarm path to which the alarm belongs is reported or not, if not reported, generating and reporting the alarm; if reported, no generating or reporting the alarm;

a correlated alarm refers to an alarm triggered by an event caused by the influence of other logic function units on the local logic function unit.

If the determined alarm type is an isolated alarm, the alarm generation module directly generates and reports the alarm; an isolated alarm refers to an alarm triggered by an event entirely caused by reason of the local logic function unit.

Wherein, a sequence consisting of alarms hierarchically numbered and caused by the same alarm reason is called an alarm path.

Figure 2:
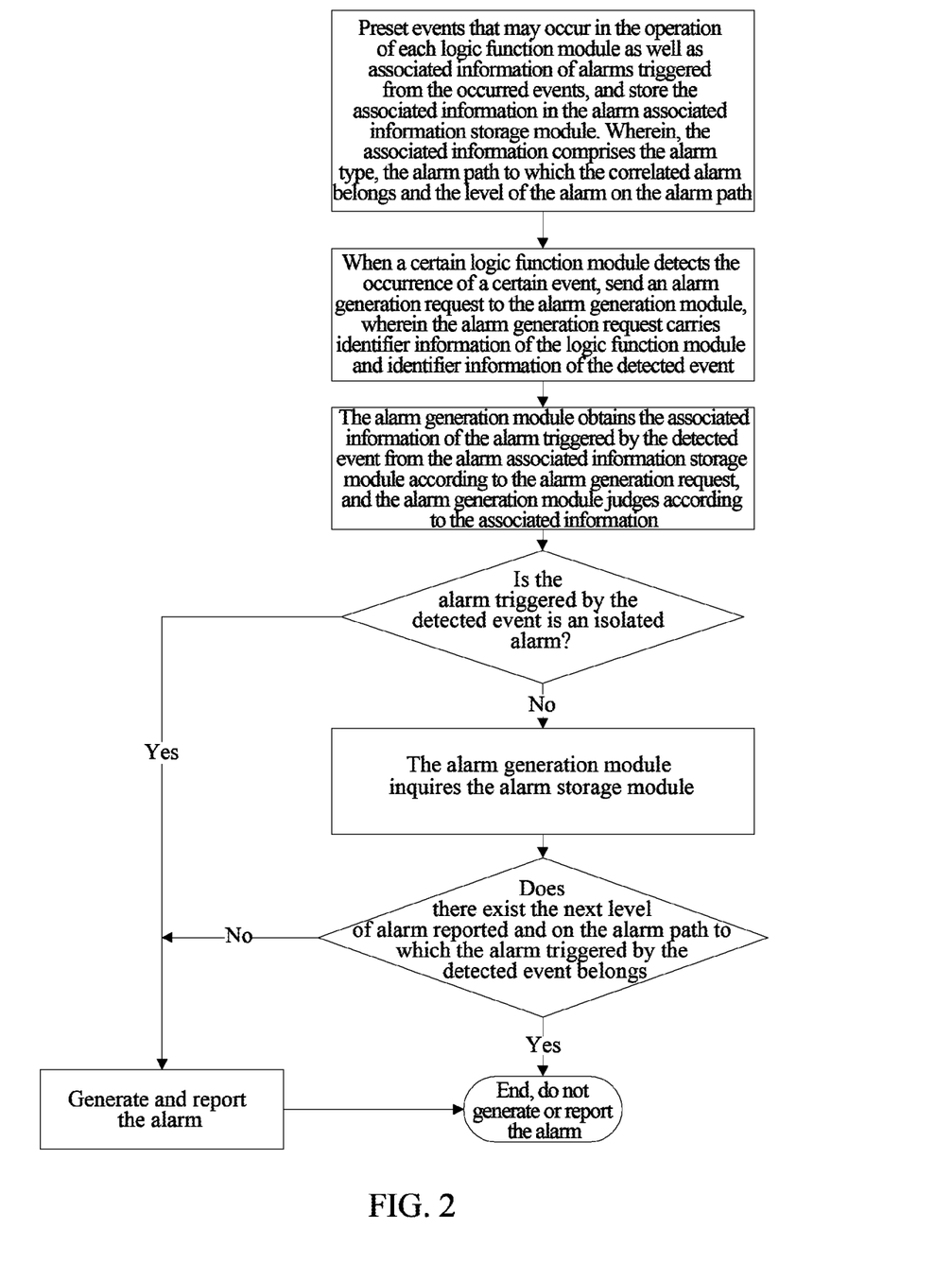
FIG. 2 is a flow chart of an alarm processing method in accordance with an embodiment the present document.

FIG. 2 is a flow chart of the alarm processing method in accordance with an embodiment of the present document may comprise:

pre-setting events that may occur in the operation of each logic function module in the network element (NE) as well as associated information of alarms triggered from the occurred events, storing the associated information in the alarm associated information storage module;

if a certain logic function module detects the occurrence of a certain event, the logic function module sending an alarm generation request to the alarm generation module, wherein the alarm generation request carries identifier information of the logic function module and identifier information of the detected event;

the alarm generation module obtaining associated information of the alarm triggered by the detected event from the alarm associated information storage module according to the alarm generation request, and judging whether to generate and report the alarm to the network element management system (EMS) or not according to the associated information, when determining that the alarm type of the alarm triggered by the detected event is an isolated alarm, directly generating and reporting the isolated alarm to the EMS; and when determining that the alarm type of the alarm triggered by the detected event is a correlated alarm, inquiring the alarm memory module to judge whether there exists the next level of alarm reported and on the alarm path to which the alarm belongs or not, and if there exists, do not generate the alarm, and if there does not exist, generate and report the correlated alarm to the EMS.

In the following, the alarm processing method in accordance with the embodiments of the present document will be described in more detail through examples.

Figure 3:
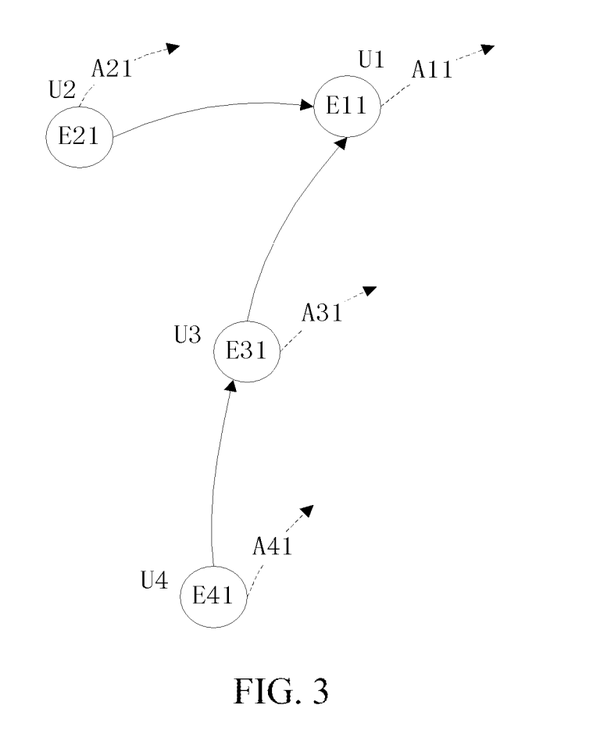
FIG. 3 is a schematic diagram of a possible alarm path related to generated and reported alarms in a logic function module.

FIG. 3 is a schematic diagram of an alarm path related to a possibly generated and reported alarm in a logic function module. As shown in FIG. 3, it is assumed that there is one logic function module U1 which may generate the event E11, and the generation of E11 may be due to the effect of event E21 of the logic function module U2 and event E31 of the logic function module U3; therefore, the U1 can generate and report an alarm A11 when detecting the E11, and the alarm A11 is a correlated alarm. Suppose that the alarm which may be reported when the U2 detects the event E21 is A21, the alarm which may be reported when the U3 detects the event E31 is A31, and there is logic function module U4 below the U3, and the alarm reported by the U4 when the event E41 occurs is A41, then the alarm A11 is a node on the following alarm paths:

alarm path 1 (AP1): A21→A11 alarm path 2 (AP2): A41→A31→A11

Therefore, for the logic function module U1, it has a corresponding message in the alarm associated information storage module, and the message is used to preset that the alarm which may be generated and reported by the logic function module U1 when detecting the event E11 is A11, and the A11 is a correlated alarm which belongs to the alarm paths 1 and 2 simultaneously, and the levels of the alarm on these two alarm paths are level 2 and level 3 respectively.

Thus, when the system (network element) is in operation, if the logic function module U1 detects an event E11, its alarm processing procedure is as follows:

when the logic function module U1 detects an event E11, the U1 sends an alarm generation request to the alarm generation module, and the request comprises identifier of the logic function module (U1), identifier of the detected event (E11) and other parameters;

the alarm generation module obtains the type information of the generated alarm from the alarm associated information storage module according to the received alarm generation request, and pre-generates alarm data. The pre-generated alarm data comprise alarm type (A11), alarm correlated type (correlated alarm), the belonging alarm paths and levels ((1,2), (2,3)), and so on;

the alarm generation module judges according to the pre-generated correlated type information (correlated alarm) of the alarm, and because the alarm is a correlated alarm, the alarm generation module inquires the alarm memory module according to information of the alarm paths to which the alarm belongs and the levels ((1,2), (2,3)), and checks if there exists an alarm whose alarm path is 1 and alarm level is 1, or alarm path is 2 and alarm level is 1 or 2 or not, if there exists, do not generate or report the alarm; if there does not exist, generate and report the alarm.

In order to increase the flexibility of the system, to facilitate the operator to efficiently manage alarms of devices from different manufacturers, the NMS can set attributes such as the alarm type, the alarm path and the level on the alarm path of the alarm reportable by each logic function module through the northbound interface, specifically comprising:

the NMS sending an alarm setting command to the network element management system through the northbound interface, and the command comprises at least one of the following parameters:

a network element identifier (NE-ID), configured to select one or more network elements to be set;

a logic function module identifier, configured to select a logic function module to be set;

an alarm type, configured to indicate the alarm type to be set;

an alarm correlated type, configured to indicated a value of the alarm correlated type to be set;

the belonging alarm path and the level on the alarm path, configured to indicate the alarm path to which the alarm type to be set belongs and the level on the alarm path;

after the network element management system receives the command, it distributes the setting command and parameters to each selected network element, and each network element sets the correlated alarm type according to the contents of the command;

after the setting is completed, the particular setting contents can be stored in an alarm type information list, and the alarm type information list can be stored in one or more of the logic function module, the network elements, the network element management system and the network management system according to different hierarchies of alarm hierarchical processing.

The abovementioned embodiments are only preferred embodiments of the present document, and not intended to limit the protection scope of the embodiments of the present document, those skilled in the art can deliberately make various modifications and variations of the embodiments of the present document without departing from the spirit and scope of the embodiments of the present document. Thus, if these modifications and variations of the embodiments of the present document belong to the claims of the embodiments of the present document and their equivalents, the embodiments of the present document are also intended to encompass such modifications and variations.

INDUSTRIAL APPLICABILITY

Due to the adoption of the abovementioned technical scheme, the embodiment of the present document comprises the following advantages: reducing the number of reported alarms, ensuring that the reported alarms are alarms at the bottom of all the alarms which may be triggered by an event, and facilitating fast positioning the cause of a fault.

What is claimed is:

1. An alarm processing method, adapted to a communication system comprising hardware performing instructions stored in a non-transitory computer readable medium which executes steps in following modules: a logic function module, an alarm generation module, an alarm associated information storage module and an alarm memory module, wherein the method comprises:

the logic function module sending an alarm generation request to the alarm generation module when detecting an event which can trigger an alarm;

the alarm generation module determining alarm type, alarm path and level of the alarm which is triggered by the event according to the alarm associated information stored in the alarm associated information storage module;

if the determined alarm type is a correlated alarm, first inquiring the alarm memory module and judging whether a next level of alarm on the alarm path to which the correlated alarm belongs is reported, if not reported, generating and reporting the alarm; if reported, no generating or reporting the alarm, wherein a sequence consisting of alarms hierarchically numbered and caused by a same alarm reason is called the alarm path, each alarm on the alarm path is of a level, an alarm directly caused by a root cause is of a lowest level, and each another alarm on the alarm path is of a higher level in sequence;

wherein the correlated alarm refers to an alarm triggered by an event caused by an influence of other logic function units on a local logic function unit.

2. The method of claim 1, further comprising:
if the determined alarm type is an isolated alarm, the alarm generation module directly generating and reporting the alarm;
wherein the isolated alarm refers to an alarm triggered by an event entirely caused by reason of the local logic function unit.

3. The method of claim 1, wherein,
the communication system is a network element in a network Element Management System.

4. An alarm processing device, applied in a network element management system (EMS), wherein the device comprising hardware performing instructions stored in a non-transitory computer readable medium which executes steps in following modules:

an alarm associated information storage module, configured to store preset events that may occur during operation of logic function modules in the network element as well as associated information of an alarm triggered by an occurred event;

a logic function module, configured to send an alarm generation request to an alarm generation module when detecting an event which may trigger an alarm;

an alarm generation module, configured to determine alarm type, alarm path and level of the alarm triggered by the event according to the alarm associated information stored in the alarm associated information storage module; if the determined alarm type is a correlated alarm, first inquire an alarm memory module and judge whether a next level of alarm on the alarm path to which the alarm belongs is reported, if not reported, generate and report the alarm; if reported, do not generate or report the alarm, wherein a sequence consisting of alarms hierarchically numbered and caused by a same alarm reason is called the alarm path, each alarm on the alarm path is of a level, an alarm directly caused by a root cause is of a lowest level, and each another alarm on the alarm path is of a higher level in sequence;

the alarm memory module, configured to store the associated information of all the generated and reported alarms;

wherein the correlated alarm refers to an alarm triggered by an event caused by influence of other logic function units on the local logic function unit.

5. The device of claim 4, wherein,
if the alarm type determined by the alarm generation module is an isolated alarm, the alarm generation module directly generates and reports the alarm;
the isolated alarm refers to an alarm triggered by an event entirely caused by reason of the local logic function unit.

6. An alarm associated information setting method, comprising:

a network management system (NMS) sending an alarm setting command to a network element management system (EMS) through a northbound interface;

upon receiving the alarm setting command, the EMS sending the alarm setting command and parameters to each selected network element, and each network element setting an alarm according to the alarm setting command; wherein, the alarm setting command comprises at least one of the following parameters:

a network element identifier, configured to select one or more network elements to be set;

a logic function module identifier, configured to select a logic function module to be set;

an alarm type, configured to indicate the alarm type to be set;

an alarm path to which the correlated alarm belongs as well as a level of the correlated alarm on the alarm path, configured to indicate the alarm path to which the set correlated alarm belongs as well as the level of the correlated alarm on the alarm path; wherein a sequence consisting of alarms hierarchically numbered and caused by a same alarm reason is called the alarm path, each alarm on the alarm path is of a level, an alarm directly caused by a root cause is of a lowest level, and each another alarm on the alarm path is of a higher level in sequence.

7. The method of claim 6, further comprising:
after completing the setting, storing the setting contents in an alarm type information list, and the alarm type information list is stored in one or more of a logic function module, network elements, the network element management system, and the network management system according to different hierarchies of alarm hierarchical processing.

8. The method of claim 2, wherein,
the communication system is a network element in a network Element Management System.

* * * * *